United States Patent
Zhang et al.

(10) Patent No.: US 7,386,420 B2
(45) Date of Patent: Jun. 10, 2008

(54) DATA ANALYSIS METHOD FOR INTEGRATED CIRCUIT PROCESS AND SEMICONDUCTOR PROCESS

(75) Inventors: Guohai Zhang, Singapore (SG); Kay-Ming Lee, Singapore (SG); Lu-Ying Du, Singapore (SG); Jui-Chun Kuo, Taipei Hsien (TW)

(73) Assignee: United Microelectronics Corp., Hsinchu (TW)

( * ) Notice: Subject to any disclaimer, the term of this patent is extended or adjusted under 35 U.S.C. 154(b) by 194 days.

(21) Appl. No.: 11/308,986

(22) Filed: Jun. 2, 2006

(65) Prior Publication Data

US 2007/0282544 A1  Dec. 6, 2007

(51) Int. Cl.
G06F 19/00 (2006.01)
(52) U.S. Cl. .......................... 702/179; 702/35; 702/84; 700/121; 714/37; 714/48; 438/14
(58) Field of Classification Search ................. 702/35, 702/82, 83, 84, 179, 180, 181; 438/14–18; 700/108, 109, 110, 111, 121; 714/37, 48
See application file for complete search history.

(56) References Cited

U.S. PATENT DOCUMENTS

| | | | |
|---|---|---|---|
| 6,055,463 A * | 4/2000 | Cheong et al. | 700/223 |
| 6,223,098 B1 * | 4/2001 | Cheong et al. | 700/223 |
| 6,292,582 B1 * | 9/2001 | Lin et al. | 382/149 |
| 6,314,379 B1 * | 11/2001 | Hu et al. | 702/81 |
| 6,828,776 B2 * | 12/2004 | Tai et al. | 324/158.1 |
| 6,959,252 B2 * | 10/2005 | Tai et al. | 702/84 |
| 6,968,280 B2 * | 11/2005 | Tai et al. | 702/84 |
| 7,016,750 B2 * | 3/2006 | Steinkirchner et al. | 700/103 |
| 2001/0042705 A1 * | 11/2001 | Nakagaki et al. | 209/44.4 |
| 2001/0051836 A1 * | 12/2001 | Lamey et al. | 700/110 |
| 2004/0124830 A1 * | 7/2004 | Tai et al. | 324/158.1 |
| 2004/0151362 A1 * | 8/2004 | Hamaguchi et al. | 382/145 |
| 2004/0193381 A1 * | 9/2004 | Tai et al. | 702/118 |
| 2005/0119778 A1 * | 6/2005 | Tsai et al. | 700/121 |
| 2005/0255611 A1 * | 11/2005 | Patterson et al. | 438/14 |

\* cited by examiner

Primary Examiner—Carol S Tsai
(74) Attorney, Agent, or Firm—Jianq Chyun IP Office

(57) ABSTRACT

A data analysis method for an integrated circuit process is described, for analyzing the results of at least an in-line quality test, a product test and a yield test done to the products of the IC process. The products are divided into a normal group and an abnormal group based on the result of the in-line quality test, and are divided into a qualified group and an unqualified group based on the result of the yield test. A categorization step is performed to define the intersection of the unqualified group and the normal group as a first problematic group and to define the intersection of the unqualified group and the abnormal group as a second problematic group. By analyzing one or both of the two problematic groups, the major yield killer can be identified so that process modification can be made accordingly to improve the yield.

15 Claims, 8 Drawing Sheets

DATA ANALYSIS METHOD FOR INTEGRATED CIRCUIT PROCESS AND SEMICONDUCTOR PROCESS

BACKGROUND OF THE INVENTION

1. Field of the Invention

The present invention relates to a method for analyzing numerous test data. More particularly, the present invention relates to a data analysis method for analyzing the test results of an integrated circuit (IC) process or a semiconductor process.

2. Description of the Related Art

With the rapid development of the IC industry, the market of electronic devices grows quickly. Most electronic elements like semiconductor chips and photoelectric devices (e.g., LED, LCD panel or PDP) are made with many steps and are similar in that their products are manufactured lot by lot with various quality tests performed through the whole process to monitor the product yield.

To adjust related machine parameters and correct deviations in an IC process, many in-line quality tests are conducted during the IC process. After the IC process is finished, various product tests are conducted. The products that pass certain product tests and thus satisfy the quality requirements of the client are called qualified products, of which the percentage among all products is defined as the product yield.

When the yield of an IC process is still low, identifying the major yield killer of the IC process is relatively easy. After the yield is raised to a certain level like 80%, however, the correlations of different test results with respect to the yield are close to each other, and large noises are present in the test data greatly increasing the possibility of mis-interpretation. Hence, it is quite difficult to identify a major yield killer, so that the identification takes much time and labor while the yield is not surely improved.

SUMMARY OF THE INVENTION

In view of the foregoing, this invention provides a data analysis method for an IC process that can be used to analyze various test results of the IC process effectively with less time and labor, so that the major yield killer is identified more easily and a process modification can be made for the major yield killer to improve the yield.

This invention also provides a data analysis method for a semiconductor process, which is capable of identifying a major yield killer of the semiconductor process more easily so that a modification can be made for the major yield killer to improve the yield.

The data analysis method for an IC process of this invention is used to analyze the results of at least an in-line quality test, a product test and a yield test conducted to multiple products of the IC process. The products are divided into a normal group and an abnormal group based on the result of the in-line quality test, and are divided into a qualified group and an unqualified group based on the result of the yield test. A categorization step is then conducted to define the intersection of the unqualified group and the normal group as a first problematic group and to define the intersection of the unqualified group and the abnormal group as a second problematic group.

The above data analysis method may further include a step of determining the group including a larger number of products among the first and the second problematic groups as a target group. If the target group is the first problematic group, a statistical analysis is made to the test data of the products in the first problematic group obtained in the product test and in the yield test, so as to identify a major yield killer. When the products include multiple dies on a wafer, the in-line quality test is possibly a defect inspection, and. When the in-line quality test is a defect inspection, the product test may be a wafer acceptance test (WAT). On the other hand, if the target group is the second problematic group, a statistical analysis is made to the test data of the products in the second problematic group obtained in the in-line quality test, so as to identify a major yield killer of the IC process.

Alternatively, the target group determination is skipped. A statistical analysis is made to the test data of the products in the first problematic group obtained in the product test and in the yield test, and another statistical analysis is made to the test data of the products in the second problematic group obtained in the in-line quality test, so as to identify a major yield killer of the IC process.

In addition, when the products include multiple dies on a wafer in the above data analysis method of this invention, the in-line quality test may be a defect inspection, a critical dimension inspection, an alignment accuracy inspection, a thickness inspection or an electrical property test.

The data analysis method for a semiconductor process of this invention is used to analyze the results of at least a defect inspection, a wafer acceptance test (WAT) and a yield test conducted to a wafer that has been subject to multiple fabricating steps and having multiple dies thereon. In the method, the dies are divided into a normal group and an abnormal group based on the result of the defect inspection, and are divided into a qualified group and an unqualified group based on the result of the yield test. A categorization step is then performing to define the intersection of the unqualified group and the normal group as a first problematic group and to define the intersection of the unqualified group and the abnormal group as a second problematic group.

The above data analysis method may further include a step of determining the group including a larger number of dies among the first and second problematic groups as a target group. If the target group is the first problematic group, statistical analysis is made to the test data of the dies in the first problematic group obtained in the wafer acceptance test and in the yield test to identify a major yield killer. If the target group is the second problematic group, a statistical analysis is made to the test data of the dies in the second problematic group obtained in the defect inspection to identify a major yield killer. Alternatively, the target group determination is skipped. A statistical analysis is made to the test data of the dies in the first problematic group obtained in the wafer acceptance test and in the yield test, and another statistical analysis made to the test data of the dies in the second problematic group obtained in the defect inspection, so as to identify a major yield killer of the semiconductor process.

Since the data analysis method of this invention divides the unqualified products into two groups based on the result of the in-line quality test, the major yield killer of the process can be identified more easily. Thus, the labor and time of the engineers can be greatly saved, and the process can be properly modified for the major yield killer identified to improve the product yield.

It is to be understood that both the foregoing general description and the following detailed description are exemplary, and are intended to provide further explanation of the invention as claimed.

DESCRIPTION OF THE PREFERRED EMBODIMENTS

The data analysis method for an IC process of this invention is suitably used to analyze the test data of one or more lots of products., wherein the IC process may be a semiconductor process, a packaging process or a fabricating process of a photoelectric device like LED, LCD panel or plasma display panel (PDP), and the products may be the dies on multiple lots of wafers, multiple lots of chips, or the pixels on multiple lots of display panels.

In a semiconductor process, for example, an in-line quality test like a defect inspection, critical dimension (CD) inspection, an alignment accuracy (AA) inspection, a thickness inspection or an electrical property test is usually conducted after deposition, exposure or etching. After the whole process is finished, product tests like a wafer acceptance test (WAT) and a circuit probe (C/P) test are conducted, wherein the C/P test belongs to a yield test.

In a packaging process, an AA inspection, a line-cutting inspection, a compound overflow inspection or a wire loop test, etc., is usually conducted after the wafer cutting, die bonding, reflow or trim/form step. After the packaging process is finished, a constant-temperature test, a burn-in test, a thermal cycle test and an electronic quality control (EQC), etc., are usually conducted.

In a LCD process, the in-line quality test includes an image inspection of the array circuit, an electrical response test and a display quality test of liquid-crystal cells, etc. After the process is finished, the product tests include function tests like a color contrast test and a view angle test as well as electric reliability tests like an electricity consumption test and a conductance/conductivity test.

Figure 1:
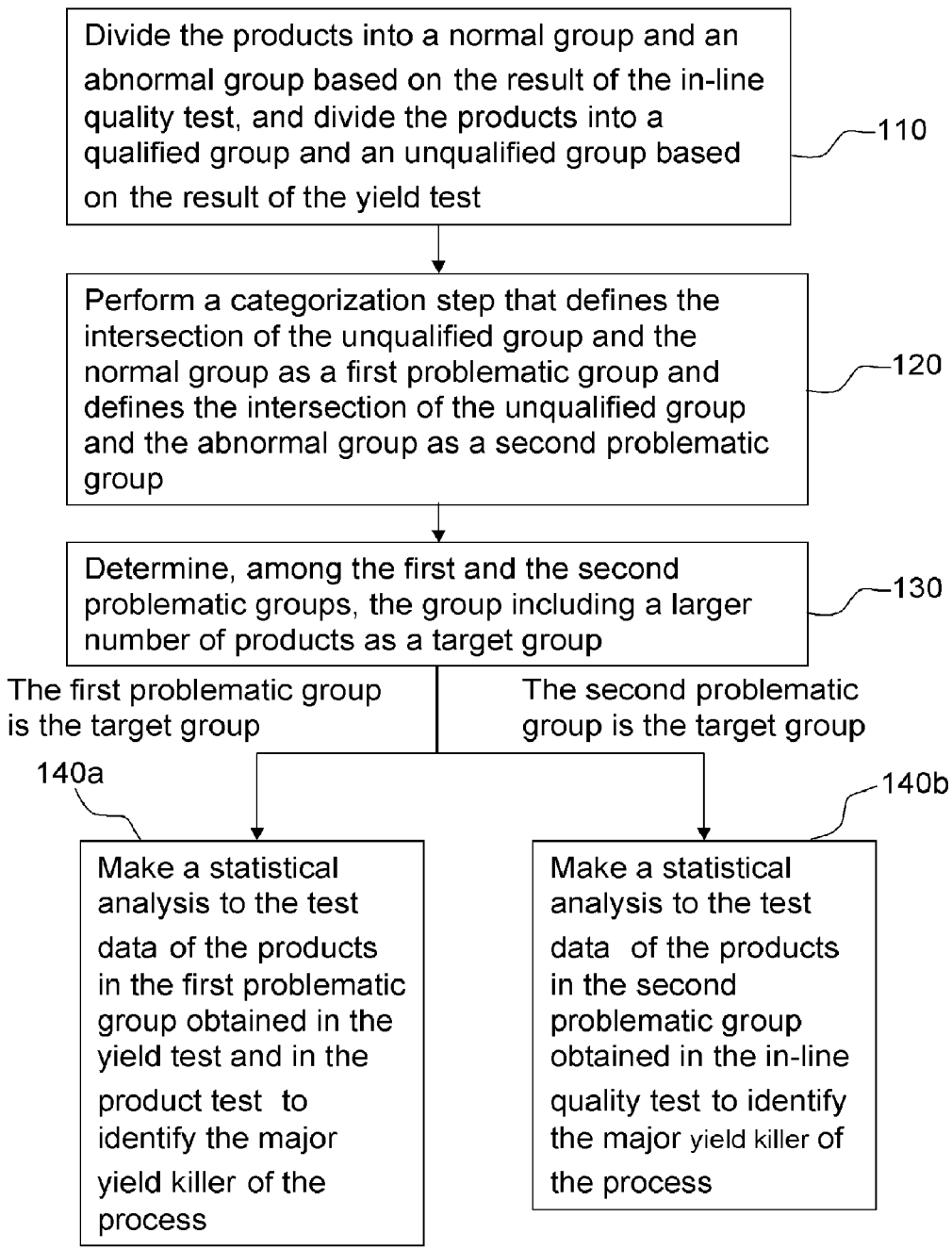
FIG. 1 is a flow chart of a data analysis method for an IC process according to an embodiment of this invention.

FIG. 1 is a flow chart of a data analysis method for an IC process according to an embodiment. Referring to FIG. 1, in step 110, the products are divided into a normal group and an abnormal group based on the result of an in-line quality test, and are also divided into a qualified group and an unqualified group based on the result of a yield test. The products in the (ab)normal group are those (not) satisfying a certain quality standard, while the products in the (un) qualified group are those (not) passing all items of the yield test.

In next step 120, a categorization step is performed to define the intersection of the unqualified group and the normal group as a first problematic group and define the intersection of the unqualified group and the abnormal group as a second problematic group. Among the first and the second problematic groups, the group including a larger number of products is determined as a target group (step 130).

If the target group is the first problematic group, a statistical analysis is made to the test data of the products in the first problematic group obtained in the yield test and in the product test, so as to identify a major yield killer for the unqualified products (step 140a). If the target group is the second problematic group, a statistical analysis is made to the test data of the products in the second problematic group obtained in the in-line quality test, so as to identify a major yield killer (step 140b).

Besides, it is particularly noted that since the first and the second problematic groups both belong to the unqualified group not passing the yield test, the above step 130 can be skipped and steps 140a and 140b are conducted directly after step 120 to identify the major yield killer of the process.

Figure 2:
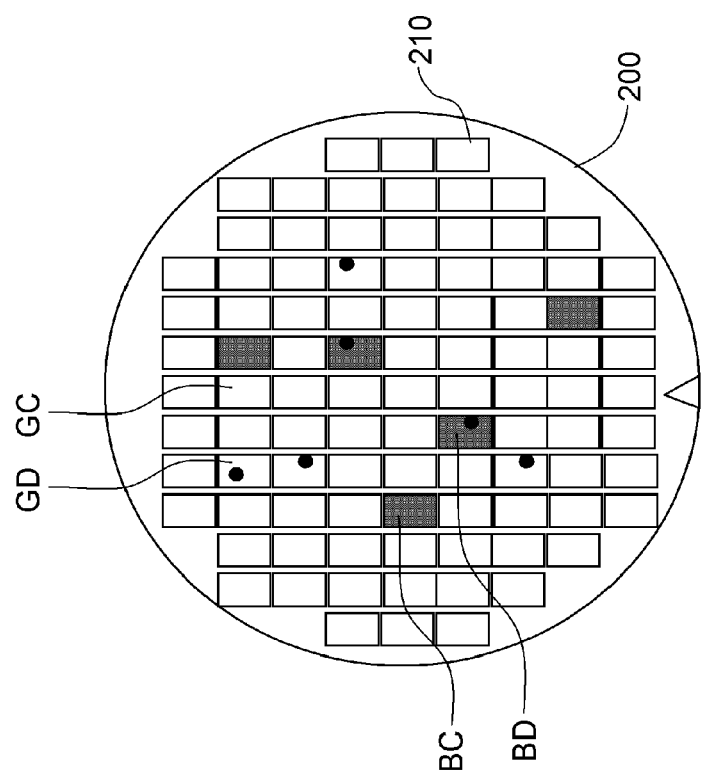
FIG. 2 shows the result of applying the group division and categorization steps in the data analysis method of this invention to a multi-die wafer as an example.

The above data analysis method is further explained below with a semiconductor process as an analysis subject, wherein the products tested and analyzed are the dies on multiple lots of wafers. FIG. 2 shows the result of applying the group division and categorization steps in the data analysis method to a multi-die wafer as an example.

Referring to FIG. 2, each of the dies 210 on the wafer 200 has been subject to deposition, lithography and etching steps, while an in-line quality test like a defect inspection is conducted after each step or several steps. With a defect inspection, for example, multiple defect maps are obtained for different films on the wafer and are then superimposed to form a complete defect map, and the dies are divided into a normal group including dies "C" with no defect thereon and an abnormal group including dies "D" with defects thereon.

After the fabricating process of the wafer 200 is finished, product tests like a wafer acceptance test (WAT) and a circuit probe (C/P) test are conducted, wherein the C/P test belongs to a yield test. In this embodiment, the yield is calculated based on the result of the C/P test only. The dies passing all items of the C/P test are defined as a qualified group and labeled with "G", while the dies not passing all items of the C/P test are defined as an unqualified group and labeled with "B".

Then, the intersection of the normal group of the dies "C" and the unqualified group of the dies "B" is defined as a first problematic group including dies "BC", and the intersection of the abnormal group of the dies "D" and the unqualified group of the dies "B" is defined as a second problematic group including dies "BD". The intersection of the normal group of the dies "C" and the qualified group of the dies "G" may also be defined as a group including dies "GC" and the intersection of the abnormal group of the dies "D" and the qualified group of the dies "G" as a group including dies "GD". The dies BC, BD, GC and GD can be defined by superimposing the complete defect map and the failure map of the C/P test (yield test). Among the dies 210 in FIG. 2, those without a black dot therein are the dies "C" of the normal group, those with a black dot therein are the dies "D" in the abnormal group, those being blank are the dies "G" in the qualified group and those being gray are the dies B in the unqualified group.

Since the dies "G" in the qualified group have passed the C/P test, only the first problematic group of the dies "BC" and the second problematic group of the dies "BD" in the unqualified group are further analyzed. The group affecting the yield more among the first and the second problematic groups, i.e., the group including a larger number of dies, is then determined as a target group. Thereafter, a statistical analysis is made to identify the major yield killer of the process, as described later in two experiment examples.

Figure 3A:
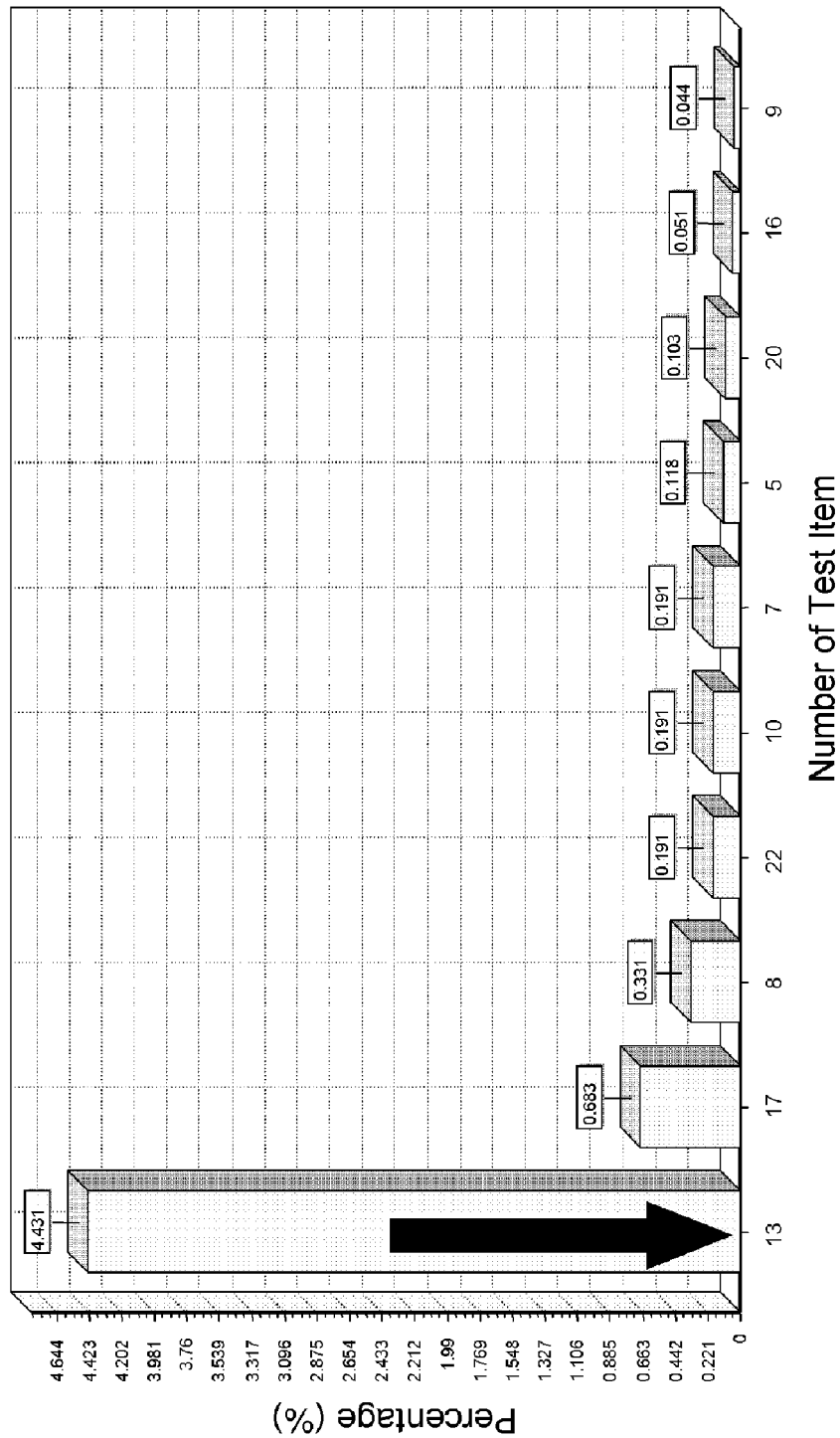
FIG. 3A plots the percentages of the dies failing in different test items of a circuit probe test as a yield test in a first experiment example of this invention.
Figure 3B:
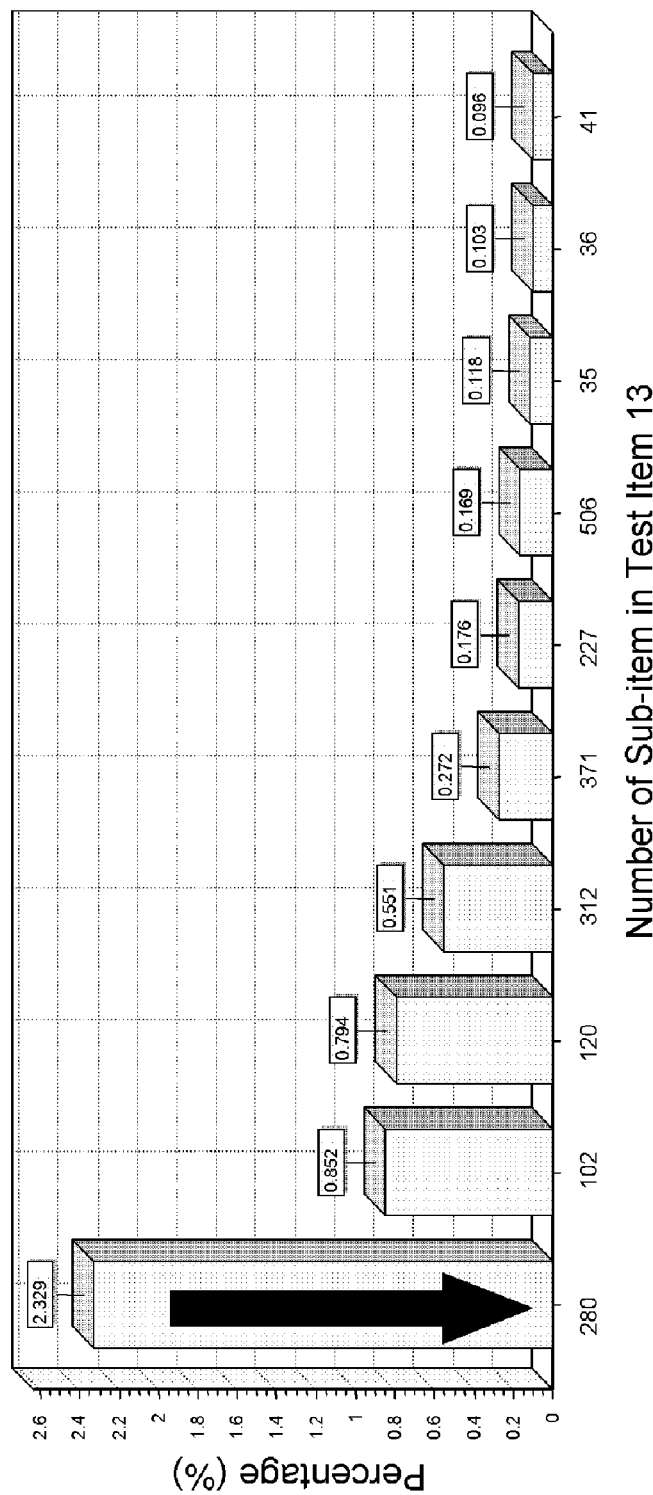
FIG. 3B plots the percentages of the dies failing in different sub-items of Test Item 13 in FIG. 3A.
Figure 3C:
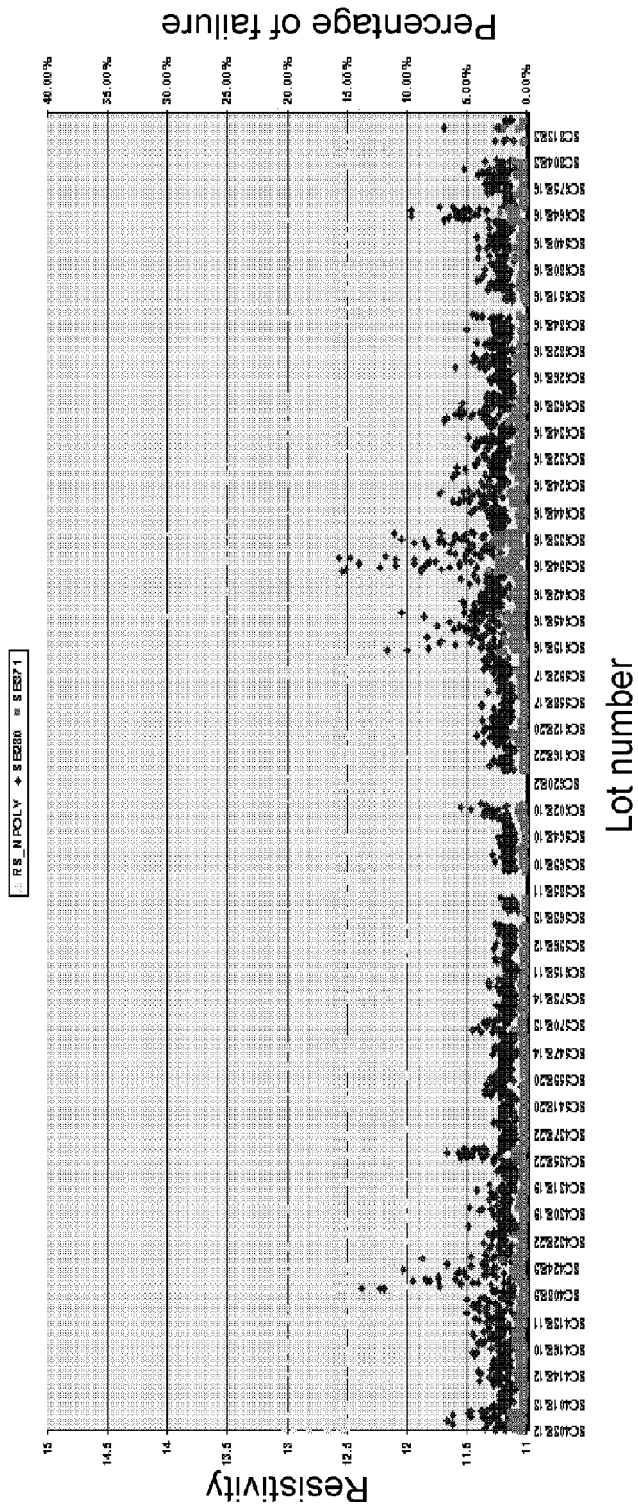
FIG. 3C shows the correlation between the percentage of the dies failing in Sub-item 280/371 in FIG. 3B and the resistivity of Film A.
Figure 3D:
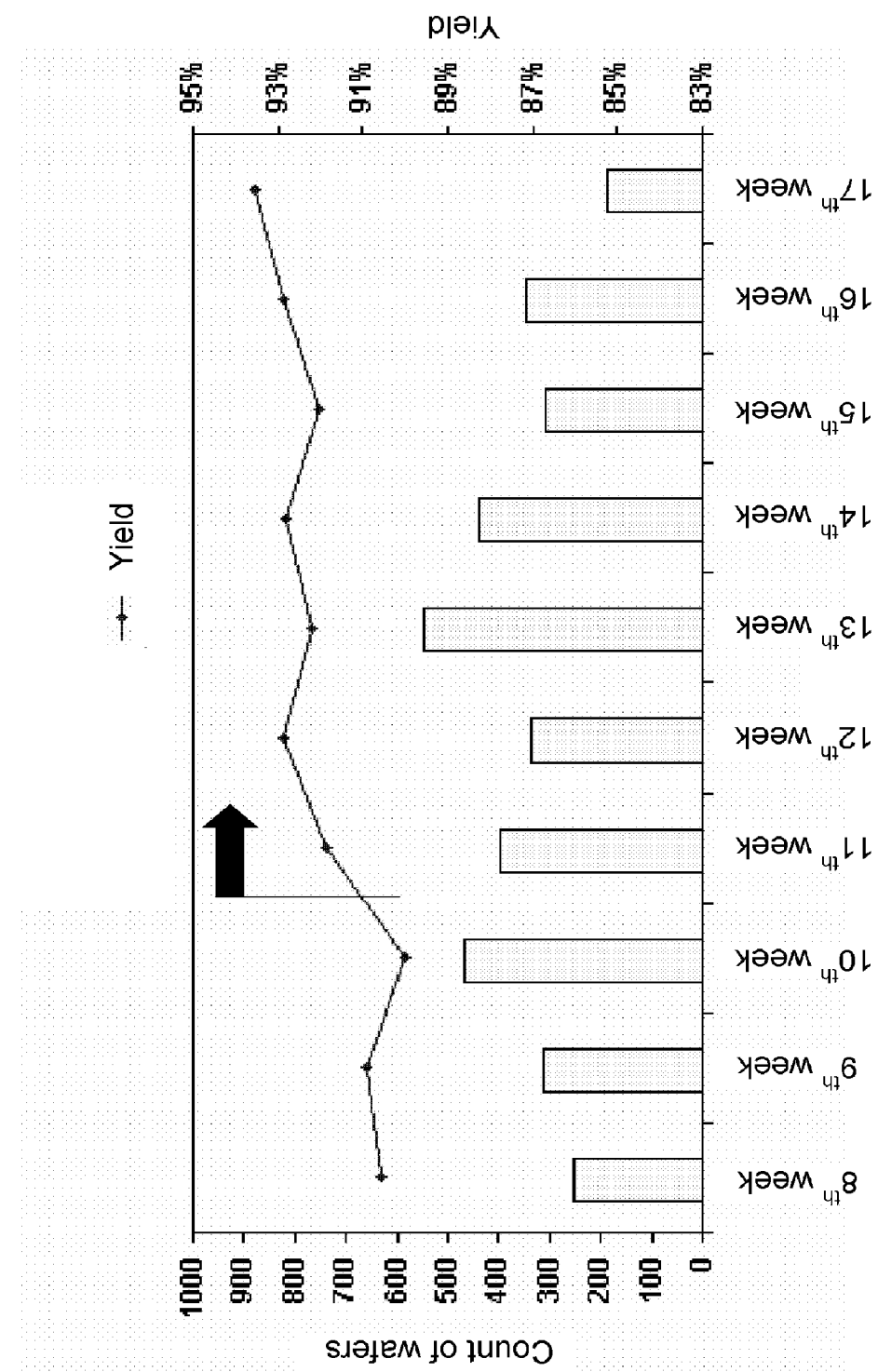
FIG. 3D shows the improvement of the yield after the process is modified for the major yield killer identified (resistivity of Film A) in the first experiment example.

The first experiment example corresponds to the case where the target group is the first problematic group, illustrated by FIGS. 3A-3D. FIG. 3A plots the percentages of the dies failing in different test items of the C/P test. FIG. 3B plots the percentages of the dies failing in different sub-items of Test Item 13 in FIG. 3A. FIG. 3C shows the correlation between the percentage of the dies failing in Sub-item 280/371 in FIG. 3B and the resistivity of Film A. FIG. 3D shows the improvement of the yield after the process is modified for the major yield killer identified (resistivity of Film A).

Referring to FIG. 3A, the percentages of the dies failing in different test items of the C/P test are plotted in bars, wherein the percentage of failure in Test Item 13 is the highest. Hence, the sub-items of Test Item 13 are selected to be further analyzed. In the resulting statistical graph in FIG. 3B, the percentage of the dies failing in Sub-item 280 of Test Item 13 is the highest.

Then, correlation analyses are conducted with respect to the percentage of failure in Sub-item 280 and the data of wafer acceptance test (WAT) for the electrical properties of the films corresponding to Sub-item 280. A part of the result is shown in FIG. 3C, wherein only the resistivity of Film A that varies in correlation with the variation of the result of Sub-item 280 is shown. It is quite obvious from FIG. 3C that the percentage of failure in Sub-item 280 having a highest percentage of failure is correlated with the deviation in the resistivity of Film A, while that in Sub-item 371 having a very low percentage of failure is not correlated with the latter. Accordingly, the deviation in the resistivity of Film A is very possibly the major yield killer.

Since the defect-correlated factors have been excluded in the first experiment example, the deviated resistivity of Film A may be caused by improper setting in the process margin or design margin. Therefore, the yield may be improved by modifying the setting. As shown in FIG. 3D, for example, after the setting is modified at the 17$^{th}$ week, the yield is increased by about 2-3%. This further proves that the major yield killer is really the deviation in the resistivity of Film A.

In the first experiment example, the statistical analysis is based on the result of a C/P BIN test that measures the electrical properties of different films and those between different pins. The C/P BIN test result includes many sub-items, wherein similar sub-items are grouped into a test item. Because the number of the sub-items is very large including numerous data, identifying the major yield killer is difficult in the prior art. In the first experiment example, however, the defect-correlated factors are precluded at first and only the first problematic group that fails in the yield test but is normal in the defect test is analyzed. Consequently, an engineer does not easily misjudge the noise or misidentify the real major yield killer, so that the labor and time can be saved greatly and the process can be modified for the real major yield killer to increase the yield.

Figure 4A:
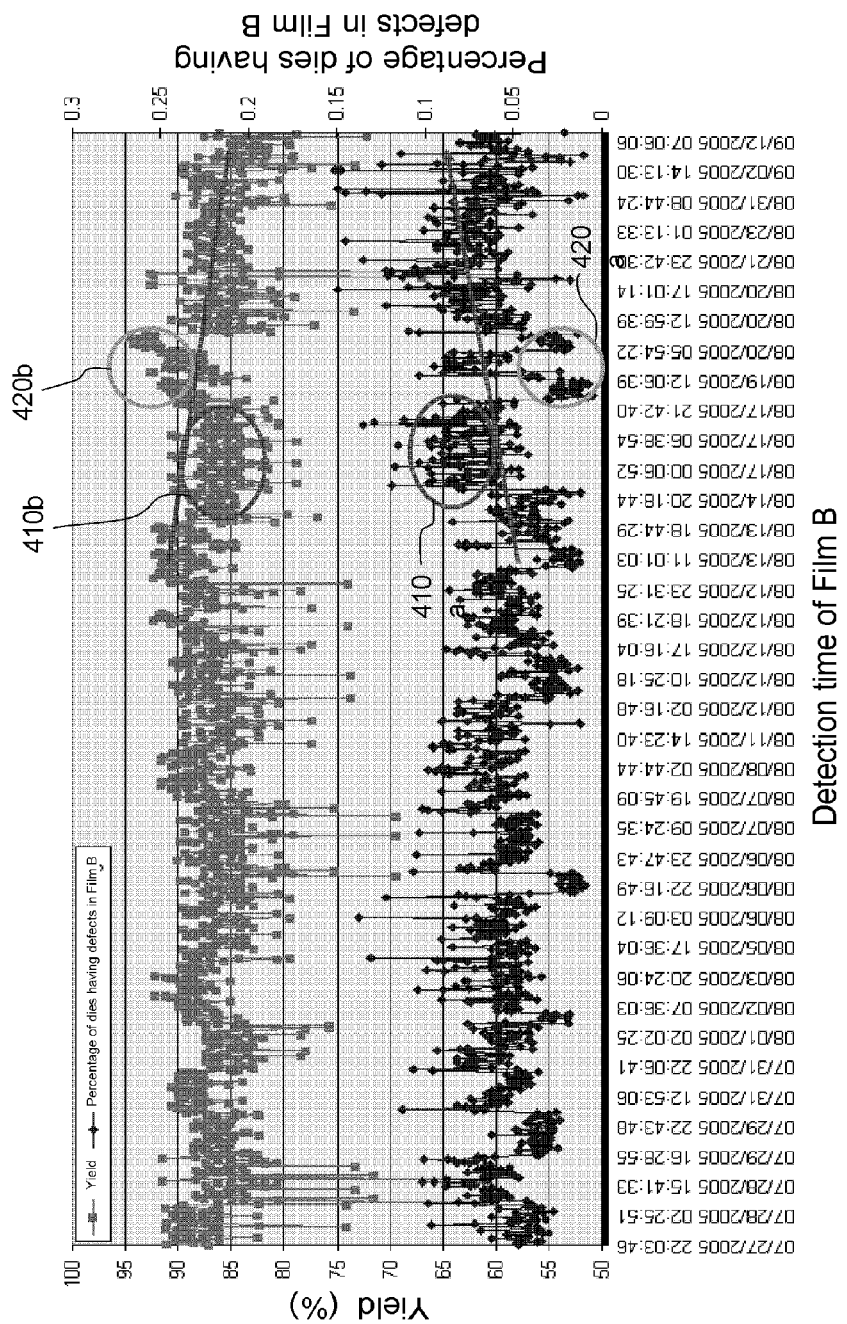
FIG. 4A shows the correlation between the percentage of the dies having defects in Film B and the yield.
Figure 4B:
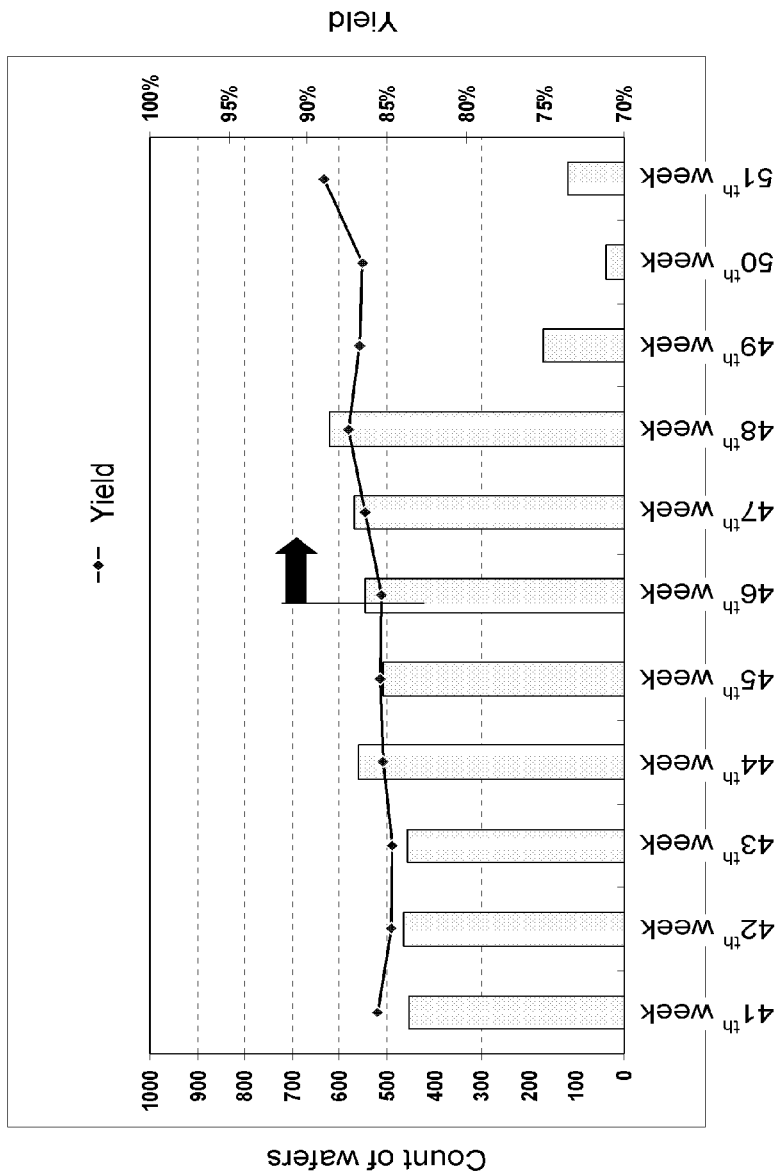
FIG. 4B shows the improvement of the yield after the process is modified for the major yield killer identified (defects in Film B) in the second experiment example.

The second experiment example corresponds to the case where the target group is the second problematic group, illustrated by FIGS. 4A-4B. FIG. 4A displays the correlation between the percentage of the dies having defects in Film B and the yield. FIG. 4B shows the improvement of the yield after the process is modified for the major yield killer identified (defects in Film B).

For the second problematic group including the dies "BD", a statistical analysis is made over each of the films with defects therein. Moreover specifically, the yield is plotted respectively against the percentage of the dies having a defect in Film B, against the percentage of the dies having a defect in Film C, against the percentage of the dies having a defect in Film D, etc. Because the percentage of the dies having a defect in Film B is found to be correlated with the yield in this example, the defect in Film B is very possibly the major yield killer. The correlation between the yield and the percentage of the dies having defects in Film B is shown in FIG. 4A. It is obvious that the yield decreases/increases with increase/decrease in the percentage of the dies having defects in Film B, as indicated by the regions 410a, 410b, 420a and 420b.

Since the defect in Film B is very possibly the major yield killer, a process modification is made to eliminate or prevent defects in Film B, possibly being an extra step in the process of Film B that is designed on the basis of experiment results. As shown in FIG. 4B, after the defect issue is improved at the 46$^{th}$ week, the yield is raised by about 2-4%. This further proves that the major yield killer is the defects in Film B.

Since only the second problematic group is analyzed in this experiment example, the dies in the first problematic group having no defects thereon but failing in the C/P test (yield test) are precluded from the analysis. Therefore, the analysis can be focused on the real major yield killer, i.e., the defects in Film B, so that a process modifications can be made for the defects in Film B to improve the yield.

Moreover, though the yield test for defining the qualified and the unqualified groups includes merely a C/P test in the above first and second experiment examples, the yield test may alternatively includes a product test other than the C/P test in a semiconductor process, a packaging process or a fabricating process of a photoelectric device like LED, LCD panel and PDP.

It will be apparent to those skilled in the art that various modifications and variations can be made to the structure of the present invention without departing from the scope or spirit of the invention. In view of the foregoing, it is intended that the present invention covers modifications and variations of this invention provided they fall within the scope of the following claims and their equivalents.

What is claimed is:

1. A data analysis method for an IC process, used to analyze results of at least an in-line quality test, a product test and a yield test conducted to a plurality of products of the IC process, comprising:

dividing the products into a normal group and an abnormal group based on the result of the in-line quality test;

dividing the products into a qualified group and an unqualified group based on the result of the yield test; and conducting a categorization step to define an intersection of the unqualified group and the normal group as a first problematic group and to define an intersection of the unqualified group and the abnormal group as a second problematic group.

2. The data analysis method of claim 1, further comprising:

determining, among the first and the second problematic groups, the group including a larger number of products as a target group.

3. The data analysis method of claim 2, further comprising:

making a statistical analysis to test data of the products in the first problematic group obtained in the product test and in the yield test when the first problematic group is the target group, so as to identify a major yield killer of the IC process.

4. The data analysis method of claim 3, wherein the products comprise a plurality of dies on a wafer.

5. The data analysis method of claim 4, wherein the in-line quality test comprises a defect inspection.

6. The data analysis method of claim 5, wherein the product test comprises a wafer acceptance test (WAT).

7. The data analysis method of claim 2, further comprising:
   making a statistical analysis to test data of the products in the second problematic group obtained in the in-line quality test when the second problematic group is the target group, so as to identify a major yield killer of the IC process.

8. The data analysis method of claim 1, further comprising:
   making a statistical analysis to test data of the products in the first problematic group obtained in the product test and in the yield test as well as making another statistical analysis to test data of the products in the second problematic group obtained in the in-line quality test, so as to identify a major yield killer of the IC process.

9. The data analysis method of claim 1, wherein the products comprise a plurality of dies on a wafer.

10. The data analysis method of claim 9, wherein the in-line quality test comprises a defect inspection, a critical dimension inspection, an alignment accuracy inspection, a thickness inspection and an electrical property test.

11. A data analysis method for a semiconductor process, used to analyze results of at least a defect inspection, a wafer acceptance test (WAT) and a yield test conducted to a wafer that has been subject to a plurality of fabricating steps and having a plurality of dies thereon, comprising:
   dividing the dies into a normal group and an abnormal group based on the result of the defect inspection;
   dividing the dies into a qualified group and an unqualified group based on the result of the yield test; and
   performing a categorization step to define an intersection of the unqualified group and the normal group as a first problematic group and to define an intersection of the unqualified group and the abnormal group as a second problematic group.

12. The data analysis method of claim 11, further comprising:
   determining, among the first and the second problematic groups, the group including a larger number of dies as a target group.

13. The data analysis method of claim 12, further comprising:
   making a statistical analysis to test data of the dies in the first problematic group obtained in the wafer acceptance test (WAT) and in the yield test when the first problematic group is the target group, so as to identify a major yield killer of the semiconductor process.

14. The data analysis method of claim 12, further comprising:
   making a statistical analysis to test data of the dies in the second problematic group obtained in the defect inspection when the second problematic group is the target group, so as to identify a major yield killer of the semiconductor process.

15. The data analysis method of claim 11, further comprising:
   making a statistical analysis to test data of the dies in the first problematic group obtained in the wafer acceptance test (WAT) and in the yield test as well as making another statistical analysis to test data of the dies in the second problematic group obtained in the defect inspection, so as to identify a major yield killer of the semiconductor process.

* * * * *